Feb. 23, 1960 H. A. COOK 2,925,714
DIFFUSER-REGENERATOR GAS TURBINE ENGINE
Filed Oct. 11, 1954 4 Sheets-Sheet 1

Inventor
HARVEY A. COOK
By [signature] Attys.

Inventor
HARVEY A. COOK

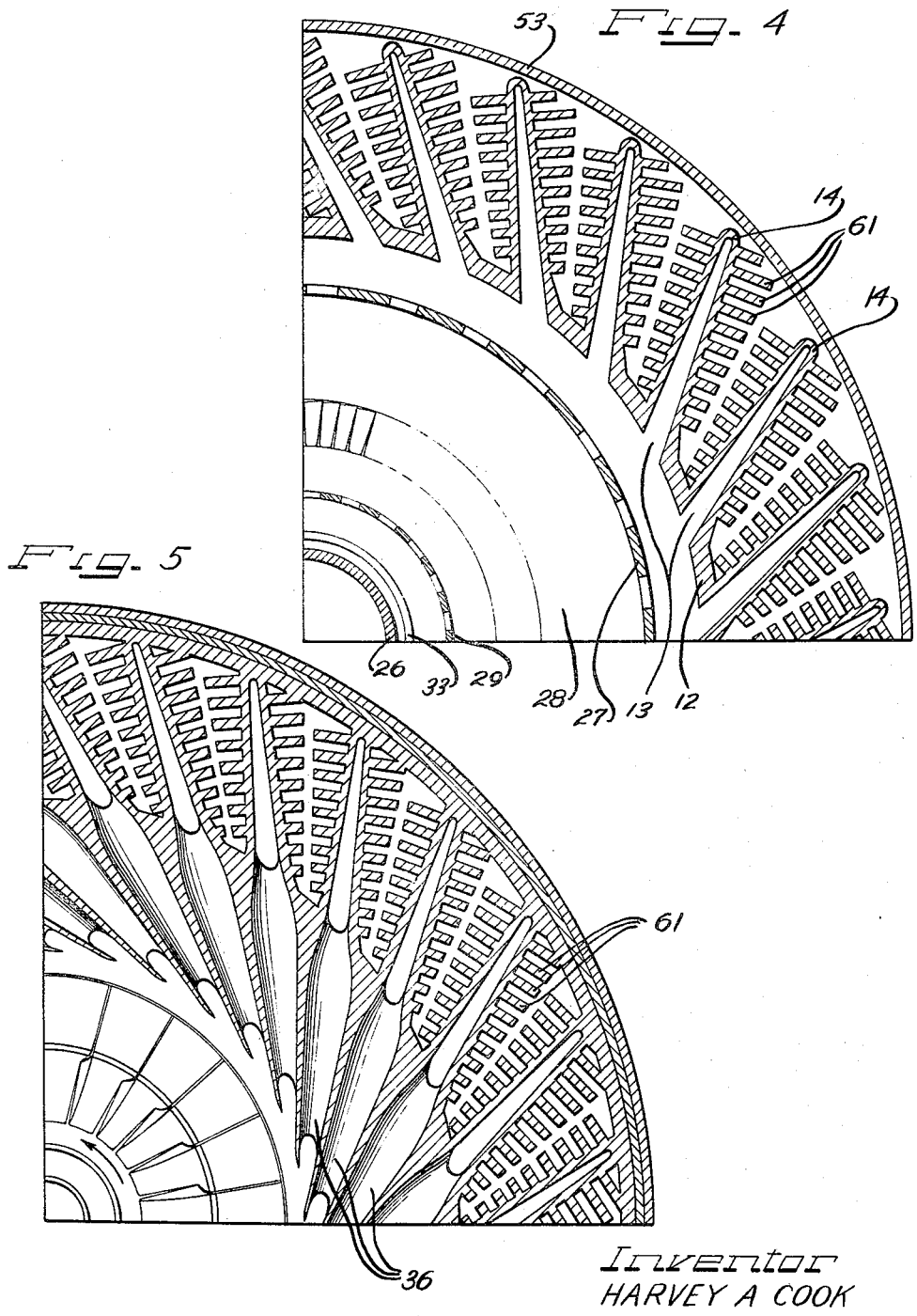

Inventor
HARVEY A. COOK

United States Patent Office 2,925,714
Patented Feb. 23, 1960

2,925,714

DIFFUSER-REGENERATOR GAS TURBINE ENGINE

Harvey A. Cook, Chagrin Falls, Ohio, assignor to Thompson Ramo Wooldridge, Inc., a corporation of Ohio Application October 11, 1954, Serial No. 461,455

2 Claims. (Cl. 60—39.16)

This invention relates to improvements in gas turbine engines, and more particularly to a means for improving the efficiency, while maintaining compactness, of the small gas turbine used in the propulsion of road vehicles or auxiliary units, although the invention may have other uses and purposes as will be apparent to one skilled in the art.

More specifically, the invention includes the provision of a diffuser-regenerator unit substantially unitarily constructed surrounding an annular combustion chamber of a gas turbine engine or the like wherein the inflowing air is substantially simultaneously diffused and heated by a diffuser-regenerator unit before entering the combustion chamber of the engine.

The problem arising in connection with gas turbine engines, and especially small gas turbine engines, has been to increase the efficiency and to lower construction costs to the point where the gas turbine engine may successfully compete with the reciprocating engine. It has been realized that in order to increase the efficiency, and especially reduce the fuel consumption, it is more or less necessary to add a regenerator. However, in the past, the addition of a regenerator has sacrificed the small size and weight of the gas turbine engine, since the regenerators of the past have been bulky, expensive, heavy, and it is anticipated would add to maintenance difficulties.

Accordingly, it is an object of this invention to obviate the above named difficulties and provide a means for increasing the efficiency and improving the operation of a gas turbine engine while reducing space, expense, and maintenance difficulties.

Another object of this invention is to provide an integral diffuser-regenerator unit for gas turbine engines or the like which eliminates ducting between the compressor diffusor and regenerator and between the regenerator and burner, thereby reducing duct pressure losses and heat losses.

Still another object of this invention is to provide a vaned diffuser-regenerator unit for a gas turbine engine which eliminates the need for collecting of the flows from the vaned diffuser passages and subsequent redivision of the flows to enter multiple passages in a regenator.

Still another object of the invention lies in the provision of a compact, rugged gas turbine engine with a diffuser-regenerator unit, wherein a small outside diameter of the engine is achieved by maintaining the flow direction established in the diffuser portion straight into the regenerator portion.

A further object of this invention resides in the provision of a unitary diffuser-regenerator for gas turbine engines formed from a single casting which eliminates joints and means for sealing said joints, thereby rendering impossible leakage in the flow from the diffuser to the burner inlet.

Still another object of this invention is in the provision of a diffuser-regenerator unit for gas turbine engines which accomplishes the diffusion in straight multiple circular cross section passages.

Another object of the invention is to provide a unitary structure of a diffuser-regenerator for gas turbine engines which surrounds the compressor and combustion chamber, and constitutes the main structural supporting frame of the engine.

Still another object of the invention lies in the provision of a diffuser-regenerator unit for gas turbine engines having an extended surface heat exchanger by providing a plurality of thinned heat exchanger elements which are bathed in hot exhaust gas flow.

A further object of this invention is to provide a unitary diffuser-regenerator unit for gas turbine engines having a plurality of hollow vanes with flattened air passages, and a plurality of air flow guides within the flattened air passages which strengthen the vane by bridging said passages, aid in directing the air flow, and add internal heat transfer surface.

Still another object of this invention resides in the provision of a diffuser-regenerator unit for gas turbine engines having a regenerator cover and collector scroll which may be easily removed for cleaning the thin surfaces of the regenerator after they have accumulated dirt from the turbine exhaust gases.

Other objects, features, and advantages of this invention will be apparent from the following detailed description of the attached sheets of drawings which illustrate the invention:

Figure 4 is an enlarged fragmentary cross sectional view of a diffuser-regenerator taken substantially along line IV—IV of Figure 1;

Figure 5 is an enlarged fragmentary cross sectional view of the diffuser-regenerator taken along substantially line V—V of Figure 1;

Figure 3:
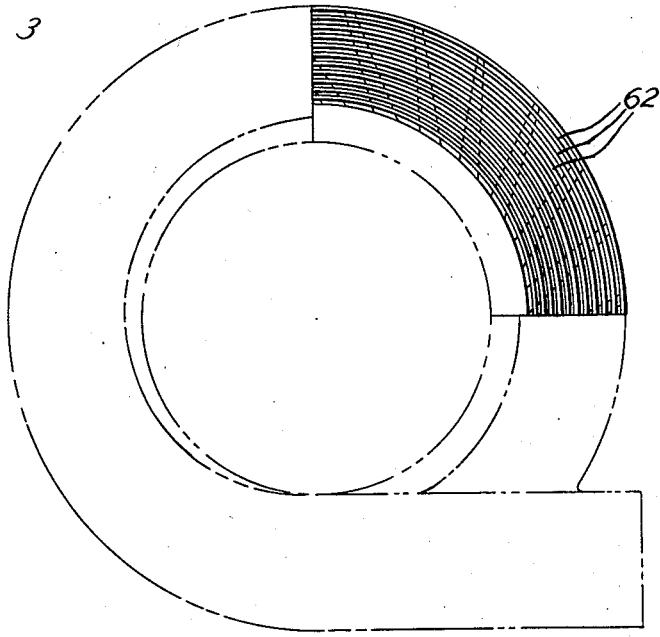
Figure 3 is an end elevational view, somewhat schematic, of an alternative embodiment of the invention, wherein the heat exchanging fins mounted on the vanes of the diffuser-regenerator take the form of continuous concentrically positioned cylindrical members.
Figure 6:
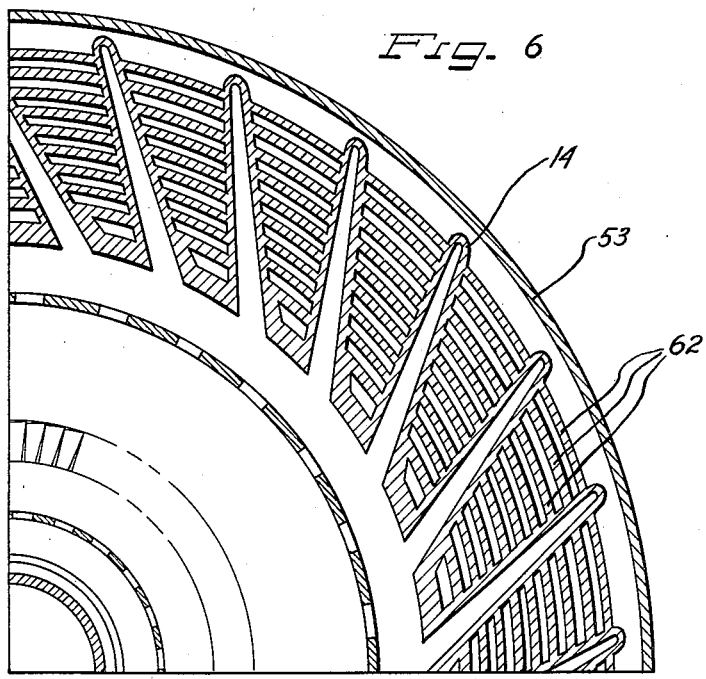
Figure 7:
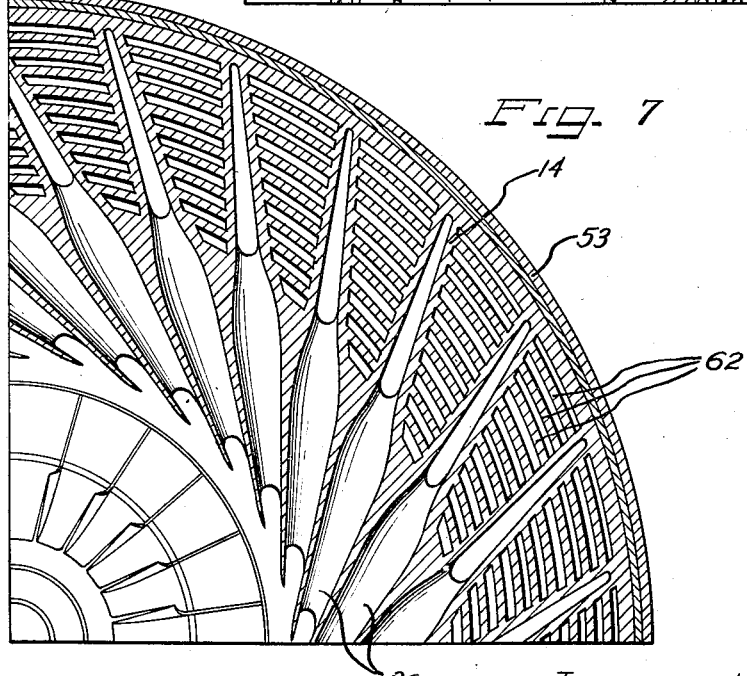

Figure 6 is an enlarged fragmentary cross sectional view taken through the diffuser-regenerator unit of a gas turbine engine substantially the same way as was Figure 4, having a modified form of fin arrangement, as shown in Figure 3; and Figure 7 is an enlarged fragmentary cross sectional view of the modified form of fin arrangement as shown in Figs. 3 and 6, taken through a diffuser-regenerator unit substantially the same way as was Figure 5.

A diffuser of a gas turbine engine functions to reduce the velocity and increase the static pressure of the air received from a compressor, while a regenerator functions to add heat to the air received from the diffuser before the air enters the combustion chamber, by utilization of waste heat in the turbine exhaust, thereby increasing the efficiency of the combustion chamber and reducing the fuel consumption thereof.

Figure 1:
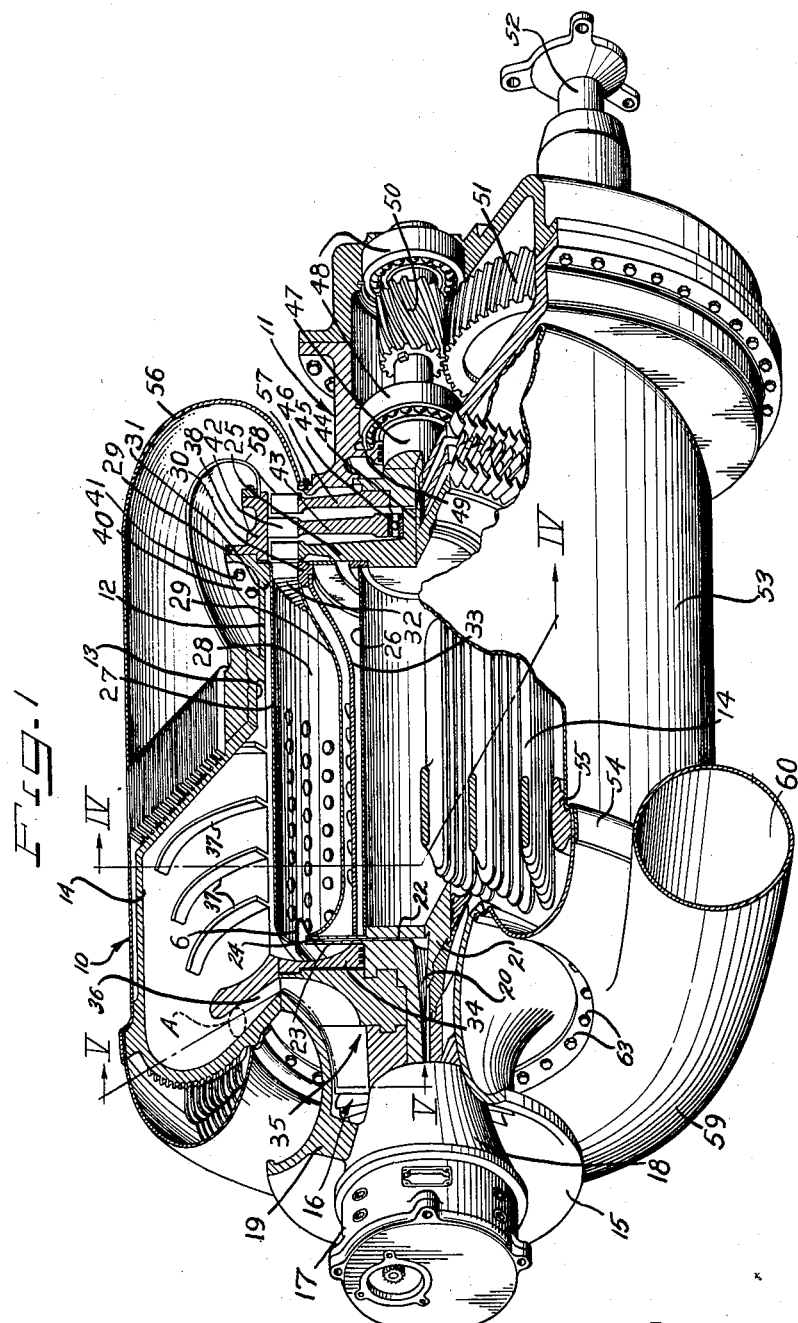
Figure 1 is a perspective view, with some parts broken away and others in section, showing a gas turbine engine embodying the invention.

Referring to Figure 1, a gas turbine engine is illustrated comprising a diffuser-regenerator unit which also serves as a main supporting frame, generally designated by the numeral 10, and a power output assembly 11.

The diffuser-regenerator unit 10 comprises a cylindrical shell 12 having a plurality of circumferentially spaced parallel slots 13 longitudinally extending along the shell wall and registering with hollow vanes 14 projecting outwardly from said shell 12. Integrally formed with the shell 12 at the forward end thereof is a converging-diverging neck portion 15 defining an air intake, which encases a centrifugal compressor generally designated at 16. Also within the air inlet portion 15 is a fuel pump assembly 17, driven by suitable means (not shown), having a tapered end 18 conically formed and disposed partially within the mouth of the inlet 15, but spaced from the inner walls thereof, and supported by a plurality of ribs 19 which may be integrally cast with the inlet 15 and the tapered member 18.

The fuel distribution system herein utilized is substantially as described in my co-pending application Serial No. 435,745, filed June 10, 1954, now abandoned, entitled "Fuel System For Gas Turbine Engines." The fuel flows from the fuel pump 17 through the axially extending bore 20 of shaft 21 to the radially projecting bores 22 of slinger arms 23 out the radially directed nozzle openings 24. The shaft 21, being operatively connected to a first stage turbine rotor 25, by means of an elongated hollow cylindrical shaft 26, rotates the slinger arms 23 and the impeller of the compressor 16 at a high speed. As the liquid fuel is thus centrifugally thrown outwardly tangentially of the nozzle openings 24, it strikes an annular fuel deflection ring 6. The deflection ring 6 is preferably rotationally fixed, such as by welding or other means, to a stationary outer wall 27 of combustion chamber 28 which is in turn, fixed to the shell 12 adjacent the turbine rotor 25. The annular combustion chamber 28, disposed within the shell 12 is defined by the outer perforated wall 27 and an inner concentrically spaced perforated wall 29 having one end fixed to a stationary ring-like flange 30. Integrally formed at the downstream end of the shell 12 and projecting inwardly is an annular shoulder 31 to which is attached one end of the outer combustion chamber wall 27 spacing it slightly from the inner surface of the shell 12. The ring-like flange 30 is generally radially aligned with the shoulder 31 and inwardly spaced concentrically therewith. A series of circumferentially spaced stator blades are secured to the outer surface of the ring 30, such as by welding or other means, bridging the annular gap between the inner and outer walls of the combustion chamber at the downstream end. Concentrically disposed inwardly from the inner wall 29 of the combustion chamber 28 is a solid or closed wall 33 supported at one end by the ring flange 30 and at the other end on an inwardly projecting radial partition 34 which separates the compressor from the combustion chamber. The partition or web 34 carries at its inner end a sealing means coacting with an enlarged portion of the shaft 21, the reduced portion of this shaft being supported in suitable bearings mounted within the tapered housing 18 of the fuel pump 17. Also carried on the reduced portion of the shaft 21 is the centrifugal compressor 16, and more particularly the two-piece impeller 35, the blades thereof conforming generally to the shape of the neck portion 15 of the shell 12.

Fluid such as air, enters the mouth of the neck portion 15, flows through the compressor where it is compressed thereby increasing its velocity when discharged from the tip of the impeller blades. From the tip of the impeller blades the air enters directly into a multitude of circular passageways or passages 36 tangentially disposed along a radial plane. The passages 36 diverge, thereby increasing in cross sectional area and constitute the vaned diffuser. Hence the air leaving the centrifugal compressor impeller moves radially only a short distance before entering the diffuser which collects the air with its radial and tangential components of flow at such an angle as to minmize entrance losses. And as said before, once the air flow is inside the vaned passages, diffusion is accomplished by increasing the area of the passage, thereby slowing down the flow to a reasonable velocity and accomplishing the desired rise in static pressure and increase in density. In the instant invention the vaned passages are rectangular at the start but quickly transformed to circular cross section for diffusion with minimum wetted surface per cross sectional flow.

The diffusion is completed as indicated at A and the passage beyond A is flattened to increase the heat exchanger effectiveness with its flow area proportioned to give a nearly constant gas velocity in turning to an axial direction and then to a radial inflow by means of guide vanes 37. The flattened area is enclosed by the walls of the hollow vanes 14.

At the downstream end of the engine a cylindrical turbine housing 38 is secured to the shell 12. The housing 38 carries at its inner periphery an outwardly projecting radial flange 39 mating with an outwardly projecting radial flange 40 of shell 12. Nut and bolt assemblies 41 or other suitable fastening means rigidly unite the two radial flanges. Rigidly secured to the inner surface of the cylindrical housing 38, such as by welding or other suitable means, is a series of circumferentially spaced stator blades 42, the inner ends of which are secured to a radially disposed centrally apertured circular plate 43. The plate 43 not only provides support for the blades 42 but also receives a stub shaft 44 of the first stage turbine rotor 25. Actually, an anti-friction bearing 45 is carried in the aperture of the plate 43 which receives the stub shaft 44.

A second stage output turbine rotor, 46, axially spaced downstream from the stator blades 42, is rotatably mounted on a shaft 47, the latter being supported by a pair of spaced bearings 48 disposed within the output housing 11. The output housing 11 is composed generally of two oppositely disposed somewhat bell shaped portions, each carrying a circumferential flange aperture to receive nut and bolt assemblies for securing them together.

Carried near the front end of the front section of housing 11 is a ring like seal 49 coacting with shaft 47 in preventing the exhaust gases passing through the turbine from entering the reduction gear assembly within the housing 11. Keyed to a reduced portion of shaft 47, between the axially spaced bearings 48, is a pinion gear 50 interengaging with a reduction gear 51 within the housing 11. Rotationally connected to the reduction gear 51 is an output shaft 52, appropriately flanged for connection to an auxiliary unit, a propulsion assembly, or other such mechanism.

As the exhaust gases expand through the turbine and leave the second stage turbine rotor 46, they are directed into the regenerator area by a cylindrical shroud or regenerator cover 53 which carries at its forward end an annular offset flange 54 adapted to fit over a ring like brace 55, the latter being connected integrally to each vane 14. The rear end of the cover 53 carries a rounded scoop portion or reverse U-bend 56, annularly flanged at 57 to be fastened, by nuts and belts or other means, to an outwardly projecting radial flange of the front section of reduction gearing housing 11. Cooperating with the regenerator cover 53 between the diffuser-regenerator shell 12 and the turbine housing 38, is a circular wall 58 attached to an outer flange of the turbine housing 38, and then bent back around to provide a space between it and the regenerator cover 53 and attached on the shell 12. The hot exhaust gases pass over the vaned diffuser-regenerator and into a scroll 59 secured to the front of the turbine engine. The scroll collects the gases and discharges them adjacent the front of the turbine engine through the outlet aperture 60.

Figure 2:
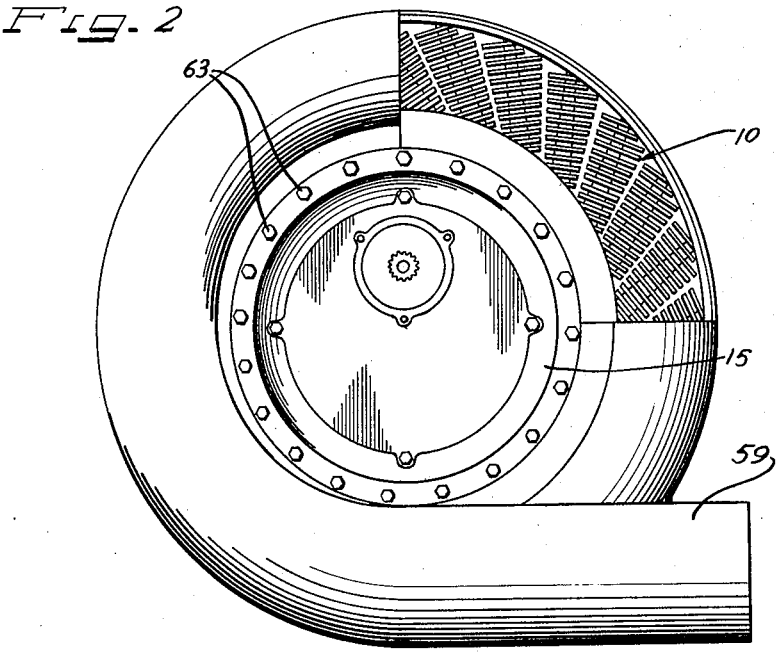
Figure 2 is an end elevational view of the gas turbine engine of Figure 1, with part of the scroll broken away to reveal a view of the diffuser-regenerator vanes of the present invention.

As seen in Figures 2, 4 and 5, the vanes 14 of the diffuser regenerator 10 carry a plurality of spaced parallel individual short fin elements 61 which may be either cast or fabricated of sheet metal or other suitable material and brazed or welded on to the hollow vanes 14. The flow of hot exhaust gases is forwarded through these finned areas between the elements and then into the collector scroll. Heat from the exhaust gases is transferred to the fins and vane to be absorbed by the incoming flow of air from the compressor.

An alternative fin arrangement is illustrated in Figures 3, 6 and 7, wherein continuous concentrically spaced fins 62 may be utilized in place of the individual short fins. Likewise the fins may be either cast or fabricated of sheet metal or other suitable materials and brazed or welded on to the hollow vanes 14. These fin arrangements provide tremendous heat exchange area for transferring the heat from the hot flow of hot exhaust gases to the incoming air within the vane before it mixes with the fuel in the combustion chamber, thereby providing a highly efficient gas turbine engine.

It may be noted in Figures 1 and 2 that by merely removing cap screws 63, which hold the scroll in place, the scroll may be easily slipped off over the neck portion 15. Likewise, the sheet metal regenerator cover 53 may be removed from the other end of the turbine engine in the same manner, after first disassembling the reduction gearing housing 11. With the collector scroll 59 and the regenerator cover 53 removed from the vaned diffuser regenerator, accessibility for cleaning of the finned surfaces on the hollow vanes is greatly facilitated. Such cleaning may be required at intervals due to the accumulation of dirt from the turbine exhaust gases.

Summarizing the air flow through the engine and its operation: the air flow on leaving the centrifugal compressor impeller moves radially along a short distance before entering the vaned diffuser, where it is directed into a large plurality of separate flow passages, shown most clearly in Figure 5. The entrances of these flow passages appear as a series of rectangular openings when viewed from the inside of the impeller housing, and the centerlines of the passages are disposed along equally spaced tangential lines originating on a circle approximately the size of the impeller. The flow direction is maintained while the air is diffused and is continued as the air moves into the regenerator part of the diffuser regenerator. A cross section of the flow passages are approximately square at the beginning, but are immediately transformed to a circular cross section for diffusion in a conical passage. When the diffusion is nearly completed the circular cross section is transformed into a flat cross section defining the area of the finned vanes 14, wherein the air is heated by the regenerator before entering the annular combustion chamber 28. From the combustion chamber the air mixed with the fuel ignites taking on more heat and then is expanded through the turbine area, wherein power is absorbed to drive the compressor and the fuel slinger, and power is taken off through a reduction gear assembly for any desired purpose. The hot exhaust gases are then directed back over the finned hollow vanes 14, which absorbs part of the heat energy from said gases, into a collecting scroll 59 and are discharged through a laterally extending tangential opening 60.

On the above descriptions, it will be understood that this invention provides a novel gas turbine engine assembly having a unitarily constructed diffuser-regenerator unit, especially adapted for small gas turbines, of compact and rugged construction, high efficiency with low fuel consumption, and capable of being economically manufactured and assembled.

It will be understood that modifications and variations may be effected without departing from the scope of the novel concept of the present invention.

I claim as my invention:

1. In combination in a gas turbine, a substantially hollow cylindrical casing, an annular combustion chamber within said casing, said casing having a funnel inlet portion of reduced diameter for receiving an air flow, a plurality of hollow vanes surrounding said casing communicating with the combustion chamber, a compressor disposed within said funnel inlet portion mounted on a rotatable shaft directing a compressed air flow into the hollow vanes, means within said vanes for diffusing the air flow, means within said vanes for guiding the diffused air flow into the combustion chamber, a fuel slinger associated with said combustion chamber, a turbine secured to said shaft downstream of said combustion chamber for absorbing energy from the products of combustion to drive said compressor and said fuel slinger, a second stage turbine axially spaced from said first turbine connected to a reduction gear assembly, means for collecting the flow of exhaust gases from the second stage turbine and directing the flow back over the hollow vanes, and a scroll partially surrounding said funnel inlet portion for collecting said gas flow and expelling same near said funnel inlet.

2. A gas turbine engine comprising in combination a radial discharge air compressing impeller, a plurality of passages surrounding the impeller and having inlet ends facing the impeller for receiving air from the impeller, a plurality of flat hollow vanes forming flat inner chambers extending axially and outwardly from said passages, said chambers having inlet ends open to said passages to receive air flow therefrom, said vanes having inner open slots extending substantially the length of the vanes and opening from the chamber, means forming a combustion chamber centrally located within said vanes and substantially coextensive therewith and open to said slots communicating with said chamber to receive a flow of air through said slots distributed along the chamber, a plurality of inwardly extending curved guide vanes within said chambers in the hollow vanes shorter than the radial length of the chambers and spaced inwardly from the radially outer ends of the chambers for receiving air between the vanes from the outer ends of the chambers and for guiding the air inwardly toward the combustion chamber, said guide vanes bridging across the chambers to join the walls of the hollow vanes to strengthen the vanes and to add internal heat transfer surface with the walls conducting heat energy to the vanes, a turbine at the axial end of said vanes opposite the inlet end and connected to receive gases from said combustion chamber, and means connected to the turbine exhaust and directing the turbine exhaust axially between said flat hollow vanes to heat the air within the vanes.

References Cited in the file of this patent

UNITED STATES PATENTS

| | | |
|---|---|---|
| 2,516,910 | Redding | Aug. 1, 1950 |
| 2,553,867 | Parducci | May 22, 1951 |
| 2,568,921 | Kroon | Sept. 25, 1951 |
| 2,591,540 | Grylls | Apr. 1, 1952 |
| 2,611,242 | Bell | Sept. 23, 1952 |
| 2,620,626 | Lysholm | Dec. 9, 1952 |
| 2,631,430 | Staley et al. | Mar. 17, 1953 |
| 2,704,439 | Cousins | Mar. 22, 1955 |
| 2,709,893 | Birmann | June 7, 1955 |
| 2,823,516 | Schelp | Feb. 18, 1958 |